Patented Mar. 14, 1944

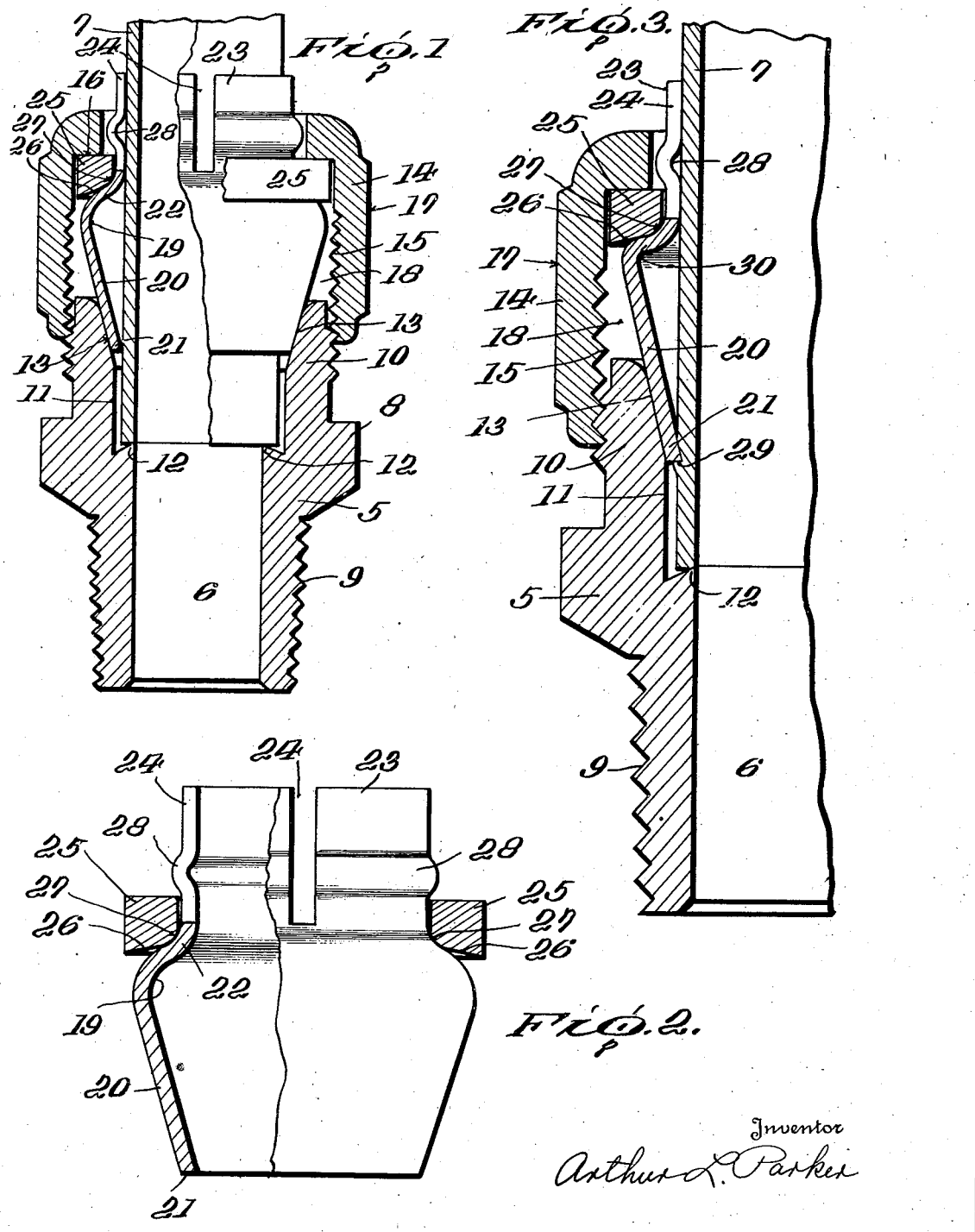

2,343,922

UNITED STATES PATENT OFFICE 2,343,922

TUBE COUPLING

Arthur L. Parker, Cleveland, Ohio, assignor to The Parker Appliance Company, Cleveland, Ohio, a corporation of Ohio Application March 16, 1943, Serial No. 479,362

4 Claims. (Cl. 285—86)

The invention relates generally to tube couplings, and more particularly to tube couplings in which the tube end is secured against a seat within threadably connected male and female coupling elements and by a clamping ferrule, and it primarily seeks to provide certain new and useful improvements in the ferrule structure and the cooperative combination thereof with the other parts of the coupling.

In its more detailed nature the invention resides in providing a coupling of the character stated in which is included threadably connected male and female elements shaped to form between them and surrounding the tube a ferrule housing chamber, one said element having a seat against which the end of the tube abuts and a tapered ferrule end contracting wall spaced a distance from said seat, a thin ferrule sleeve having a sharp ended taper disposed within said contracting wall, an inwardly directed bead-like shoulder and a split, cylindriform end extension closely surrounding the tube at a point remote from the seat, and a clamping and deforming ring encircling the ferrule against the bead-like shoulder and effective when forced longitudinally during the threading of the elements together to force the ferrule longitudinally and cause the sharp end to be contracted and bite into the tube and force it against the seat, and also to deform the bead-like shoulder inwardly and cause the end extension to engage in vibration dampening contact with the tube.

Another object of the invention is to provide for use in a coupling of the character stated a novel clamping ferrule and ring combination comprising a thin ferrule sleeve having a sharp ended taper merging into an inwardly directed bead-like shoulder which in turn merges into a cylindriform extension having generally the same internal diameter as that of the taper extremity, a clamping ring surrounding the extension adjacent said shoulder, and an outwardly directed retainer bead adjacent the ring and loosely confining the ring between it and said shoulder.

With the above and other objects in view that will hereinafter appear, the nature of the invention will be more fully understood by following the detailed description, the appended claims and the several views illustrated in the accompanying drawing.

In the drawing:

Figure 1 is a central longitudinal section of a tube coupling embodying the invention, parts being shown in side elevation.

Figure 2 is a part central longitudinal section and part side elevation of the ferrule and ring sub-combination.

Figure 3 is a fragmentary longitudinal sectional view illustrating the tube clamped condition of the coupling.

In the example of embodiment of the invention illustrated in the accompanying drawing, the male element 5 is provided with an axial bore 6 of substantially the same diameter as the inside diameter of the tube 7 which is to be coupled or clamped. The male element includes a non-circular body portion 8 from one end of which extends an externally threaded and tapered mounting portion 9, and from the other end of which extends an externally threaded female element receiving extension 10. The male element 5 is counterbored as at 11, and this counterbore provides a tube end abutment shoulder in the form of an inwardly inclined ridge 12.

The male element counterbore 11 also includes a flared extension 13, the purpose of which will be described hereinafter.

The female element 14 includes an internally threaded bore 15 which is threadable onto the externally threaded extension 10 of the male element. The internally threaded bore 15 of the female element terminates in a transverse abutment wall 16, and the female element includes a non-circular nut portion 17.

It will be observed by reference to Figure 1 of the drawing that the male and female coupling elements are so shaped as to form between them and surrounding the tube 7 a ferrule housing chamber 18. A thin metal shell or ferrule sleeve 19 surrounds the tube 7 within the chamber 18 and includes a tapered end portion 20 which terminates at its small end in a sharp end extremity 21 having an internal diameter large enough to just slip over the external surface of the tube 7. At its large end the tapered end portion 20 of the ferrule sleeve merges into an inwardly turned bead-like shoulder 22, and this shoulder in turn merges into a cylindriform extension 23 of a diameter for closely surrounding the tube 7 and of a length for extending beyond the female coupling element 14 in the manner clearly illustrated in Figure 1. The cylindriform extension 23 is longitudinally split or recessed as at 24 in a manner for facilitating contraction of the extension into gripping contact with the external surface of the tube 7 in the manner and for the purpose later to be described.

A solid metal clamping ring 25 surrounds the ferrule adjacent the bead-like abutment 22 and between said abutment and the abutment shoulder 16 of the female coupling element 14, and the face of the ring 25 which opposes the bead-like abutment 22 of the ferrule is abruptly flared as at 26, and this flare of the ring merges with the internal diameter of the ring in a smoothly curved corner 27. The cylindriform extension 23 of the ferrule is equipped with an outwardly directed retainer bead 28 which is disposed at the side of the clamping ring 25 away from the bead-like abutment 22, said bead serving to maintain a loose assembly of the clamping ring on the ferrule in the manner clearly illustrated in Figure 2 of the drawing.

In assembling the coupling the sub-combination assembly of the ferrule 19 and the loosely surrounding clamping ring 25 illustrated in detail in Figure 2 is slipped over the end of the tube 7 which is to be coupled, and the tube with the sub-combination assembly thereon is then slipped into the counterbore 11 of the male coupling element 5. The female coupling element 14 which has been slipped over the end of the tube prior to the mounting of the sub-combination assembly thereon is then threaded onto the male element in the manner illustrated in Figure 1. As the abutment shoulder 16 of the female element engages the clamping ring 25 it forces the clamping ring against the bead-like abutment shoulder 22 and causes the ferrule 19 to move endwise along the tube 7. It will be observed that the taper of the ferrule end portion 20 and the flare 13 of the male element bear the same angular relation to the axis of the tube, and as the ferrule is forced longitudinally in the coupling in the manner stated the flared wall 13 will cause the sharp end extremity 21 of the ferrule to be contracted so that it will bite into the external surface of the tube as at 29 and force the tube 7 longitudinally so as to seat tightly against the ridge seat 12. Continued tightening of the coupling will cause the clamping ring 25 to deform the bead-like abutment shoulder 22 of the ferrule to conform substantially to the flare 26 of the ring and cause the cylindriform extension 23 to be contracted into tight gripping contact with the external surface of the tube 7. The provision of the well rounded corner 27 on the ring will prevent sharp bending such as might rupture the ferrule, and the ring 25 definitely places the vibration dampening embracement of the tube 7 at a point remote from the seated end of the tube.

The herein described coupling structure is very simple and efficient and the provision of the novel form of ring and ferrule combination not only serves to desirably maintain the loose assembly of these two parts when not actually clamped in the coupling, but also serves to provide a structure in which any tendency of the ferrule to turn during the threading together of the male and female coupling elements is avoided.

It is of course to be understood that the details of structure and the arrangement of parts may be variously changed and modified without departing from the spirit and scope of the invention.

I claim:

1. A coupling for tubes comprising threadably connected male and female elements, one of said elements having a bore in alignment with the tube bore and a counterbore for receiving and forming an abutment seat for the tube end and said one element also including a flared ferrule end contracting wall spaced from and extending away from said seat, said elements being shaped to provide a ferrule receiving chamber between them and surrounding the tube and defined at one end by an abutment shoulder formed on the other of said elements, a thin ferrule sleeve surrounding the tube within said chamber and including a sharp ended taper extended at its small end within the flared wall and merging at its large end in an inwardly directed bead-like shoulder which in turn merges into a cylindriform extension closely surrounding the tube, and a clamping ring surrounding the sleeve extension between the bead-like shoulder and the abutment shoulder and adapted when the elements are threaded together to be forced by the abutment shoulder against the bead-like shoulder and in turn force the ferrule longitudinally and cause the taper end to be contracted by the flared wall and bite into the tube and force it against said seat and also to deform the bead-like shoulder inwardly and cause the end extension to engage in vibration dampening contact with the tube.

2. A coupling as defined in claim 1 in which the cylindriform ferrule extension includes an outwardly directed bead adjacent the clamping ring at the end away from the bead-like shoulder and cooperating with the latter in holding the ring in loose assembly on the ferrule.

3. A coupling as defined in claim 1 in which the taper of the ferrule and the flare of the ferrule end contracting wall bear the same angular relation to the axis of the tube.

4. A clamping ferrule and ring combination for use in couplings of the character described and comprising, a thin ferrule sleeve having a sharp ended taper merging at its large end into an inwardly directed bead-like shoulder which in turn merges into a cylindriform extension having generally the same internal diameter as that of the taper extremity, a clamping ring surrounding the extension adjacent said shoulder, and an outwardly directed retainer bead on said extension adjacent the ring and loosely confining the ring between it and said shoulder.

ARTHUR L. PARKER.